United States Patent [19]
Wichert

[11] Patent Number: 5,314,287
[45] Date of Patent: May 24, 1994

[54] PROCESS AND DEVICE FOR ATTACHING AN AIRCRAFT NOSE LANDING GEAR TO AN AIRCRAFT TRACTOR

[75] Inventor: Benno Wichert, Welzheim, Fed. Rep. of Germany

[73] Assignee: Schopf Maschinenbau GmbH, Ostfildern, Fed. Rep. of Germany

[21] Appl. No.: 777,414

[22] PCT Filed: May 14, 1990

[86] PCT No.: PCT/EP90/00775

§ 371 Date: Jan. 21, 1992

§ 102(e) Date: Jan. 21, 1992

[87] PCT Pub. No.: WO90/14266

PCT Pub. Date: Nov. 29, 1990

[30] Foreign Application Priority Data

May 26, 1989 [DE] Fed. Rep. of Germany ....... 3917255

[51] Int. Cl.⁵ ............................................... B64F 1/22
[52] U.S. Cl. ........................... 414/427; 180/904; 244/50; 414/428; 414/430; 414/786
[58] Field of Search ............................ 414/426–430, 414/786; 244/50; 180/904

[56] References Cited

U.S. PATENT DOCUMENTS

| 4,375,244 | 3/1983 | Morin | 414/429 X |
|---|---|---|---|
| 4,632,625 | 12/1986 | Schuller et al. | 414/429 |
| 4,658,924 | 4/1987 | Dobbie | 414/426 X |
| 4,810,157 | 3/1989 | Schopf | 414/429 |
| 4,917,563 | 4/1990 | Pollner et al. | 414/428 |
| 4,917,564 | 4/1990 | Pollner et al. | 414/430 X |
| 4,950,121 | 8/1990 | Meyer et al. | 414/429 X |
| 4,997,331 | 3/1991 | Grinsted et al. | 414/429 |

FOREIGN PATENT DOCUMENTS

| 0126386 | 11/1984 | European Pat. Off. . |
| 0276779 | 8/1988 | European Pat. Off. . |
| 0309760 | 4/1989 | European Pat. Off. . |
| 3327628 | 2/1985 | Fed. Rep. of Germany ........ 244/50 |
| 3801855 | 9/1988 | Fed. Rep. of Germany . |

*Primary Examiner*—David A. Bucci
*Attorney, Agent, or Firm*—Kenyon & Kenyon

[57] ABSTRACT

A tractor tows an aircraft with a landing gear having a nose wheel in accordance with a method for coupling the landing gear to the tractor. The tractor and the nose wheel are moved relative to each other on an apron until they contact each other. A shovel member of the tractor is coupled to the chassis of the tractor and movable within a recess of the chassis to be lowered to receive the nose wheel and raised to lift the nose wheel. The shovel member is slidable relative to the chassis and underneath the nose wheel so that it is located entirely between the nose wheel and the apron for receiving and at least partially supporting the nose wheel. The nose wheel is then immovably coupled to the shovel member. The shovel member is then raised to lift the nose wheel above the apron for towing the aircraft with the tractor.

46 Claims, 7 Drawing Sheets

PROCESS AND DEVICE FOR ATTACHING AN AIRCRAFT NOSE LANDING GEAR TO AN AIRCRAFT TRACTOR

BACKGROUND OF THE INVENTION

The invention relates to a process for attaching an aircraft nose landing gear having at least one nose wheel to an aircraft tractor, whereby the aircraft tractor and the nose wheel are moved towards each other on an apron until they make contact. A shovel of the aircraft tractor which receives the nose wheel is lowered until it touches or almost touches the apron and, after receiving the nose wheel, it is raised together with the nose wheel. The invention also relates to an aircraft tractor with a chassis showing a fork-shaped recess, as well as with a raisable and lowerable shovel arranged in the area of the recess for receiving an aircraft nose landing gear having at least one nose wheel. The aircraft nose landing gear is moved on the apron toward the aircraft tractor until it is in a limit-stop position.

In the case of a known aircraft tractor of this type (German Published Patent Application 3801855), when it is lifted up, the nose wheel of an aircraft is gripped from behind by the gripping arms of a gripping and pull-in device and pulled on to the lowered shovel of a stationary aircraft tractor. Since the aircraft must be moved for the nose wheel to be picked up, the aircraft nose wheel can only be pulled on to the shovel when all the passengers are seated and the passenger bridges have been retracted. This can lead to delays in clearing the aircraft which is ready for take-off. Moreover, the known aircraft tractors must have a very heavy construction, so that when the nose wheel is pulled nearer, the static friction force of the braked aircraft tractor is always greater than the breakaway resistance of the much heavier aircraft. In addition, the supporting rollers which act upon the flexible bearing surfaces of the nose wheel do not produce a continuous forward movement of the aircraft, but rather a jerky forward movement.

SUMMARY OF THE INVENTION

Therefore, the object of the invention is to develop a process for attaching an aircraft nose landing gear to an aircraft tractor, in which the aircraft does not have to be moved, and to improve the known aircraft tractor to the effect that it can pick up the aircraft nose landing gear of a stationary aircraft.

Further advantageous refinements and developments of the invention are revealed in the dependent claims.

The idea behind the invention is to avoid shifting movements between the aircraft and the aircraft tractor on the apron when the aircraft nose landing gear is attached to the aircraft tractor. To achieve this, the invention proposes that after approaching each other, the aircraft tractor and the nose wheel are coupled to each other on the apron, so that they are stationary and immovable, and that subsequently the lowered shovel is shifted relative to the aircraft tractor and is thereby slid completely under the nose wheel.

The shovel is slid effectively under the nose wheel at right angles to its axis of rotation, whereby the unbraked nose wheel is set into a rotary motion.

Before the coupling operation, the aircraft tractor can be driven up to the nose wheel until making contact, or the nose wheel can be gripped from behind by the aircraft tractor and the aircraft tractor can be pulled nearer to the nose wheel until contact is made. For the coupling operation, the nose wheel which abuts against a limit stop of the aircraft tractor is effectively gripped from behind by the aircraft tractor and pressed against the limit stop.

The nose wheel, which is coupled to the aircraft tractor, can be lifted, preferably lifted up from the apron, by the aircraft tractor before the shovel is slid under it, and after the shovel is slid under it, it can be set down on the shovel.

After the shovel is slid under the nose wheel, the nose wheel is advantageously immovably secured with respect to the shovel, preferably by pressing the nose wheel on to the shovel. During the towing operation, the shovel which is lifted together with the nose wheel can be locked with respect to the aircraft tractor. When the aircraft tractor is uncoupled from the nose wheel, the shovel is first lowered and then expediently moved out from underneath the nose wheel which meanwhile is set into a rotary motion.

A preferred refinement of an aircraft tractor provides that the aircraft tractor is able to be immovably coupled in the limit-stop position to the aircraft nose wheel standing on the apron, and that the lowered shovel is able to be slid completely under the nose wheel relative to the chassis of the aircraft tractor. It is expedient that the shovel is able to be moved under the unbraked nose wheel, at right angles to the axis of rotation of the nose wheel. A gripping and clamping device, which rotatably supports the nose wheel, can serve thereby as an abutment.

According to another preferred refinement of the invention, the shovel is supported so that it can be displaced longitudinally in a lifting fork which is capable of being raised and lowered opposite the chassis. When the shovel is raised, the lifting fork or the shovel itself is able to be locked, preferably at different lifting heights, with respect to the chassis.

The lowered shovel advantageously has a low ground clearance, so that it does not slide on the apron when it is pushed under the nose wheel. An edge configured to slide underneath, which points diagonally to the apron and is turned toward the nose wheel, thereby facilitates the sliding of the shovel under the nose wheel.

According to an advantageous refinement of the invention, the shovel features a wedge-shaped or concavely rounded stop face, which projects over the top side of the shovel and is provided for the nose wheel resting on the shovel.

Another advantageous refinement of the invention provides that, after the coupling operation, the nose wheel can be lifted by the aircraft tractor, preferably off the apron. The nose wheel is effectively lifted thereby with the help of the gripping and clamping device. The gripping and clamping device can also be used advantageously to secure the nose wheel to the shovel which has been pushed all the way under it, preferably by forcing the nose wheel against the shovel.

To enable a rotary motion of the nose wheel when the shovel is slid under it, according to another preferred refinement of the invention, the aircraft tractor features at least one tappet roller, which abuts in the limit-stop position against a part of the rolling surface of the nose wheel that is turned toward the aircraft tractor with an axis of rotation which is aligned at right angles to the longitudinal axis of the aircraft tractor. To reduce the surface pressure, several tappet rollers can be provided, which are arranged in each case in pairs on a mounting support and are able to swivel around an axis that is parallel to their axis of rotation. It is beneficial that the tappet roller or the mounting support for the tappet rollers be able to move in the direction of impact toward a shock absorber.

According to another preferred refinement of the invention, to pull the aircraft tractor nearer to the nose wheel until contact is made and to couple the aircraft tractor to the nose wheel which abuts against the limit stop, the aircraft tractor has at least one gripping arm which can swivel behind the nose wheel situated inside the recess. This gripping arm is provided with at least one rotatable pressing roller which can be positioned against the rolling surface of the nose wheel. Another preferred refinement of the invention provides that on both sides of the recess, a gripping arm is hinged on a gripping-arm support so that it can swivel around one perpendicular axis in each case, whereby the two gripping arms that are swung behind the nose wheel are capable of being locked together.

According to another preferred refinement of the invention, the interlocked gripping arms can be pulled in the direction of the tappet roller, so that while the nose wheel is clamped between the pressing rollers and the tappet roller, the aircraft tractor can be coupled to the nose wheel. To pull the gripping arms in the direction of the tappet roller, a telescopic cocking cylinder is provided, which can be connected to the gripping-arm supports as well as to the mounting support for the tappet roller.

When the aircraft nose landing gear is attached to the aircraft tractor, one can dispense with coupling the aircraft tractor and the nose wheel, when during the attaching process, at the least however during the time that the lowered shovel is slid underneath, a sliding movement between the aircraft tractor and the nose wheel is prevented because both the aircraft tractor as well as the aircraft nose landing gear are immovably retained with respect to the apron. For this purpose, the brakes of the aircraft tractor and/or a part of the other aircraft wheels can be actuated.

In this case, only after the shovel is raised, is the nose wheel advantageously secured to prevent it from moving on the shovel. This is preferably done by clamping the nose wheel between the shovel and at least one limit stop that abuts on the nose wheel.

A preferred refinement of an aircraft tractor for the push-back operation provides that the shovel with its top side forms a support surface for carrying the raised nose wheel, and that the shovel with the support surface can be lowered until it is close to the ground, and that when the aircraft tractor is stationary the shovel can be slid relative to its chassis completely under the nose wheel. The shovel's capability to be lowered close to the ground guarantees that the force exerted parallel to the apron on the aircraft nose wheel when the shovel is slid underneath does not exceed the static friction between the other aircraft wheels and the apron. Therefore, an abutment behind the nose wheel is not needed. A further reduction in the force acting on the nose wheel when the shovel is slid underneath can be achieved in that the shovel is able to be moved at right angles to the axis of rotation of the nose wheel under the unbraked nose wheel.

BRIEF DESCRIPTION OF THE DRAWINGS

The invention shall be clarified in greater detail in the following based on several exemplified embodiments which are schematically depicted in the drawing. The Figures illustrate as follows.

DETAILED DESCRIPTION

The preferably hydrostatically driven aircraft tractor 10 depicted in the drawing is essentially comprised of a chassis 12 with a steerable front axle 14 and two individually suspended back wheels 16,16', a driver's compartment 18, as well as a pick-up attachment 22 for the nose wheel 24 of an aircraft nose landing gear. The pick-up attachment 22 is arranged in a U-shaped recess 20 of the chassis 12 which recess opens to the back.

The pick-up attachment 22 has a lifting fork 26 which can be raised and lowered with respect to the chassis 12, and a shovel 28 which is supported so that it can be displaced longitudinally in the lifting fork 26. In the case of the aircraft tractors depicted in FIG. 1 through 6, in addition a gripping and clamping device 29 is provided for the nose wheel 24. This gripping or clamping device 29 is provided with two supporting bars 30,30', which are pivoted on the lifting fork 26, a tappet-roller mounting support 32 arranged between the two supporting bars 30,30', as well as two gripping arms 36 which can swivel out from the supporting bars 30,30' behind the nose wheel.

Figure 1:
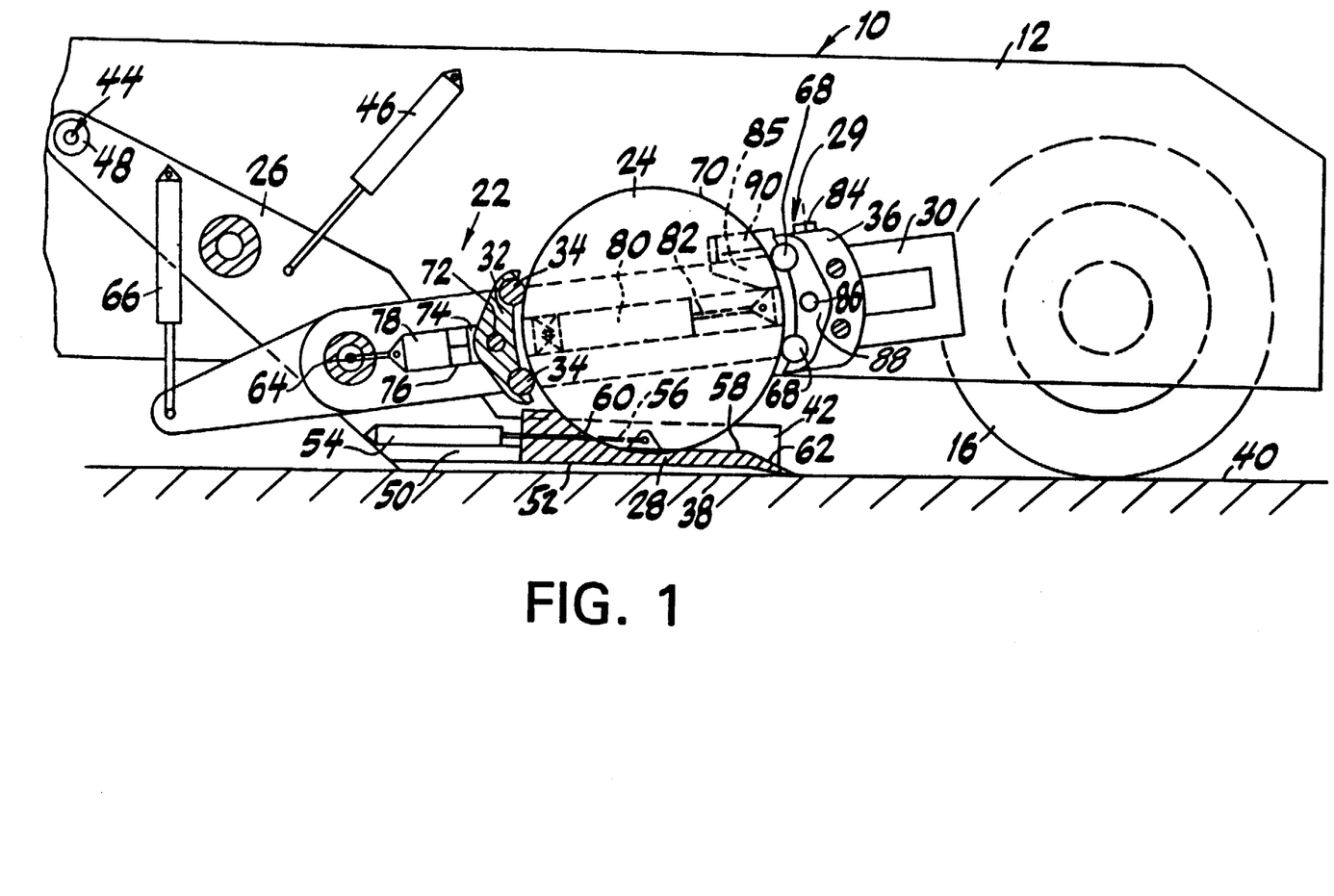
FIG. 1 a perpendicular longitudinal section along the line of intersection A—A of FIG. 2 through the rear part of an aircraft tractor including the shovel that picks up the aircraft nose landing gear.

The lifting fork 26 of the pick-up attachment 22 depicted in FIG. 1 consists of two flexurally stiff side flanges 42, which rest with a bearing surface 38 on the apron 40 when the lifting fork 26 is lowered. The side flanges 42 are rigidly connected to one another in their front area which is turned toward the driver compartment 18. The lifting fork 26 is pivoted around a swivel axis 44 in bearings 48 of the chassis 12 and can be lifted by means of one or more lifting cylinders 46 out of its lowered position (FIG. 1) until the bearing surface 38 shows more or less the same ground clearance as the chassis 12.

The shovel 28 carrying the nose wheel 24 bridges over the clearance space between the two side flanges 42 and is supported so that it can be displaced longitudinally in guideways 50 of the side flanges 42, whereby the bottom side 52 of the lowered shovel 28 shows a small clearance from the apron 40 (FIG. 1). The longitudinal displacement of the shovel 28 takes place by means of two shovel cylinders 54, which are each connected to one of the side flanges 42 and whose piston rods 56 are pivoted on the shovel 28. The shovel 28 features a concavely rounded stop face 60, which projects over the shovel top side 58 and is provided for the nose wheel 24 which rests on the shovel 28. On its side facing opposite the stop face 60, the shovel 28 is provided with a chamfered edge 62, which is designed to slide underneath and extends up to the apron 40. To protect the apron 40 and the nose wheel 24, the edge 62 that slides underneath is coated with a wear-resistant plastic.

The two interconnected supporting bars 30,30' of the gripping and clamping device 29 are pivoted in the side flanges 42 of the lifting fork 26 in sliding bearings 64 and can be vertically adjusted opposite the lifting fork 26 through the action of the hydraulic cylinders 66. In this manner, the tappet rollers 34 and the pressing rollers 68 arranged on the gripping arms 36 can be adapted to different nose-wheel diameters, or rather be brought into contact with different points of contact on the rolling surface 70 of a nose wheel 24. If the points of contact of the tappet rollers 34 or of the pressing rollers 68 are situated on mutually opposing areas of the rolling surface 70, then the nose wheel 24 can be held securely to prevent sliding. While to force the nose wheel 24 against the shovel 28, for example during the towing operation, it is advantageous for the points of contact to lie in the top half of the rolling surface 70, to lift the nose wheel 24 before the shovel 28 is slid under it, it is more practical for the points of contact to be selected in the lower half of the rolling surface 70. The nose wheel 24 is likewise lifted through the action of the hydraulic cylinders 66 to relieve the shovel 28 when it is slid underneath the nose wheel.

The two tappet rollers 34 abutting against the rolling surface 70 of the nose wheel 24 are rotatably supported in a rocker-type mounting support 32. The mounting support 32 features a swivel axis 72 which is parallel to the axes of rotation of the tappet rollers 34, so that in the limit-stop position, the two tappet rollers 34 always abut against the rolling surface 70. On both front sides, the mounting support features slide blocks 74, which are movable to a limited extent in guideways 76 of the supporting bars 30,30'. The sliding path of the slide blocks 74 is limited by the lift of a damping cylinder 78 which has a shock absorbing and pressure absorbing function.

On their side turned away from the damping cylinder 78, the slide blocks 74 are connected to a cocking cylinder 80, whose piston rod 82 engages with the gripping-arm holder 85 which can be displaced longitudinally in the guideway 76 of the supporting bar 30,30'. The gripping arms 36 can thus be pulled in the direction of the tappet rollers 34, until the tappet rollers 34 and the pressing rollers 68 abut on the rolling surface 70 of the nose wheel 24. By raising or lowering the supporting bars 30,30', one can thereby select, as needed, the points of contact of the tappet rollers 34 and of the pressing rollers 68 on the rolling surface 70.

The pressing rollers 68 of the gripping arms 36 are arranged on a mounting support 88 which can rotate around a swivel axis 86, so that during the coupling operation, both pressing rollers 68 abut on the rolling surface 70 of the nose wheel 24.

Figure 2:
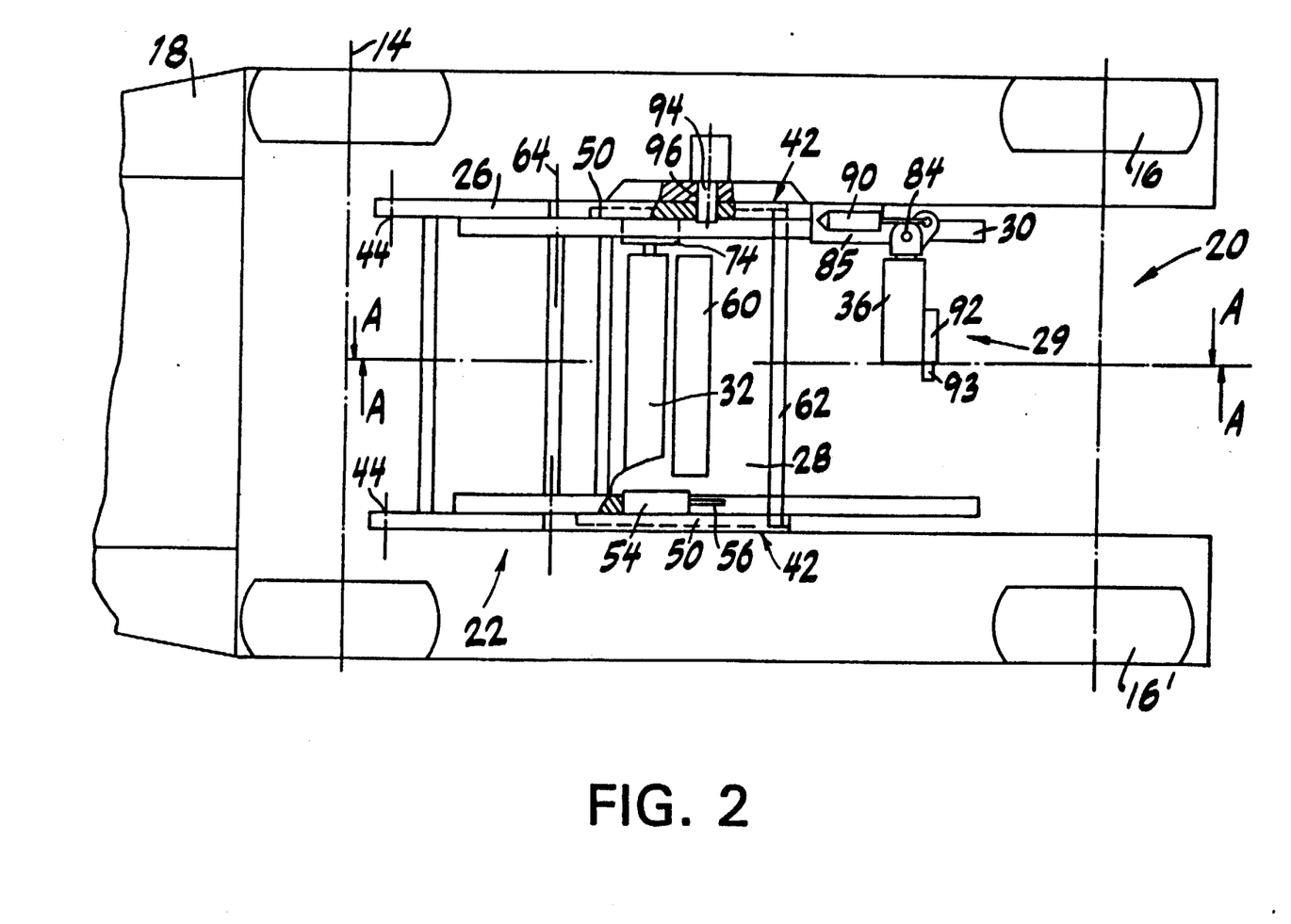
FIG. 2 a top view of the aircraft tractor according to FIG. 1 in a partially intersected representation.

The gripping arm 36 depicted in FIG. 2 is pivoted on a gripping-arm holder 85 around a perpendicular axis 84 in the same way as the second gripping arm (not depicted), which is configured on the opposite side of the recess 20. Through the action of the swiveling cylinder 90, the gripping arm 36 can be swiveled out of an open position, which is parallel to the supporting bar 30, into the closed position (FIG. 2), in which the gripping arm 36 grips the nose wheel 24, which occupies the recess 20, from behind.

The gripping arm 36 is provided with a hydraulically actuated locking unit 92. The locking operation with the opposite gripping arm takes place as soon as the two gripping arms, which are swivelled into the closed position, are in alignment with each other. This is the case when the piston rod 82 is driven out causing both gripping-arm holders 85 to slide in the guideways 76 of the supporting bars 30,30' up to a defined end position.

In principle, it would also be possible to swivel the gripping arms out of the recess 20 of the chassis 12 to open them to the top. Due to space limitations, however, the described configuration is more advantageous.

To secure the raised lifting fork 26 during the towing operation, lock bolts 94 are used. They are arranged in the chassis 12 and can be inserted mechanically or hydraulically from the chassis 12 into corresponding cut-outs 96 in the side flanges 42 of the lifting fork 26.

To control the driving gear and the service brake, the damping cylinders 78 as well as the cocking cylinders 80 are provided with hydraulically or electrically functioning pressure sensors 150. The pressure sensor provided to the damping cylinder 78 measures forces acting on the tappet roller 34 or on the mounting support 32.

Figure 3:
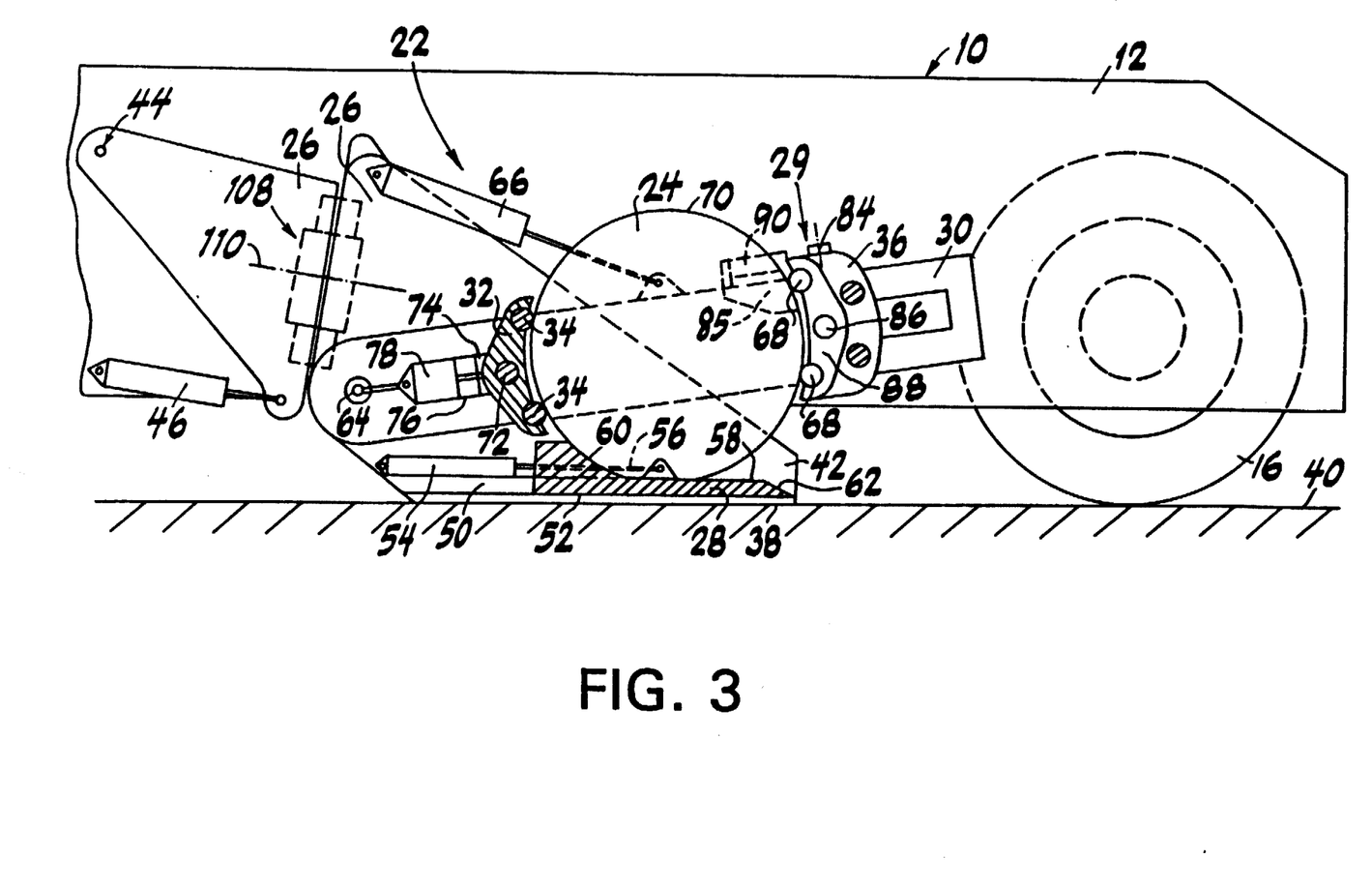
FIG. 3 a perpendicular section through the rear part of an aircraft tractor, whose lifting fork in the elevated position can swivel to a limited extent around an axis of rotation which is essentially parallel to the longitudinal axis of the aircraft tractor.
Figure 7:
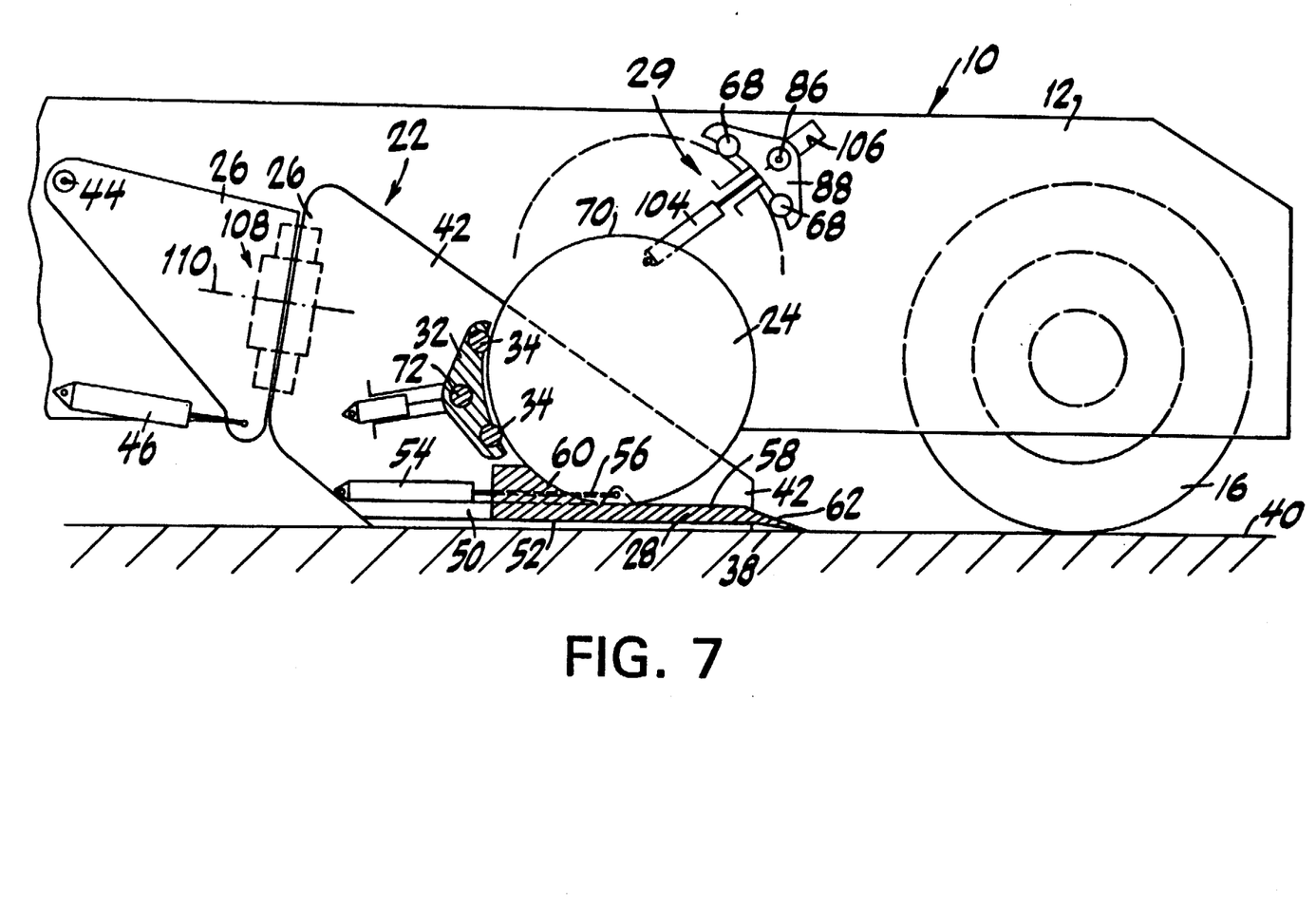
FIG. 7 a longitudinal section through the rear part of an aircraft tractor, in which the nose wheel is not gripped from behind during the attachment process.

The lifting fork 26 depicted in FIG. 3 and 7 is divided in two, whereby the two parts are connected by a swivel joint 108, whose axis of rotation 110 runs essentially parallel to the longitudinal axis of the aircraft tractor when the lifting fork is raised. The rear part of the lifting fork which supports the shovel 28 can rotate around the axis of rotation 110, opposite the front part which is pivoted on the chassis 12. A hydraulic cylinder, which is not depicted, makes it possible thereby to dampen or control the rotary motion of the rear part. If the chassis 12 of the aircraft tractor 10 tips, for example because of axle or tire damage, then the swivel joint prevents unacceptably high bending forces from acting on the clamped nose wheel 24. For shock absorption, the swivel joint 108 can be prestressed on both sides by spring elements. The lock bolts 94 for securing the raised lifting fork 26 engage with cut-outs 96 of the lifting-fork part which is not rotatably supported.

Unacceptably high bending forces acting on the aircraft nose wheel 24 because of damage to the axles or tires of the aircraft tractor 10 can also be prevented by a pair of jackwheels. These jackwheels are arranged with clearance between their rolling surface and the apron, and they can be swung out mechanically or hydraulically between the chassis 12 and the apron 40 when the aircraft tractor 10 is coupled to the aircraft nose wheel 24. In case of tire or axle damage, the part of the aircraft tractor which is tipping braces itself by means of one of the jackwheels against the apron, so that the tipping movement remains restricted to a small tipping angle. The jackwheels can only be swivelled into their supporting position when a nose wheel is clamped between the tappet rollers and the pressing rollers. If the aircraft tractor is driven without an airplane hitched to it, the jackwheels remain in their retracted position.

Figure 4:
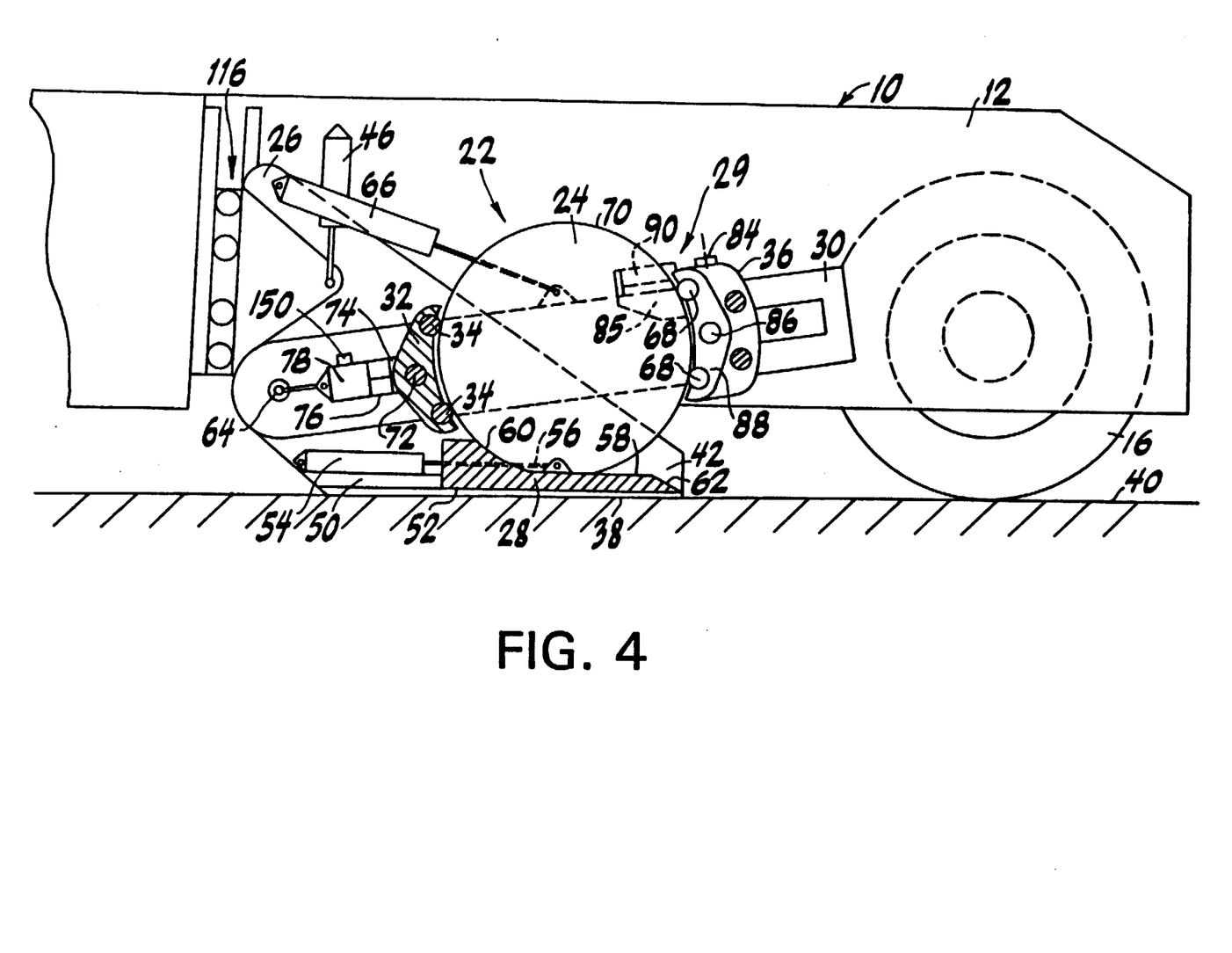
FIG. 4 a longitudinal section through the rear part of an aircraft tractor with a lifting fork which is movably and perpendicularly supported in roller guideways.

The lifting fork 26 of the aircraft tractor depicted in FIG. 4 is supported so that it is vertically displaceable in one or more roller guideways within the recess 20, and can be raised or lowered by means of one or more lifting cylinders 116.

Figure 5:
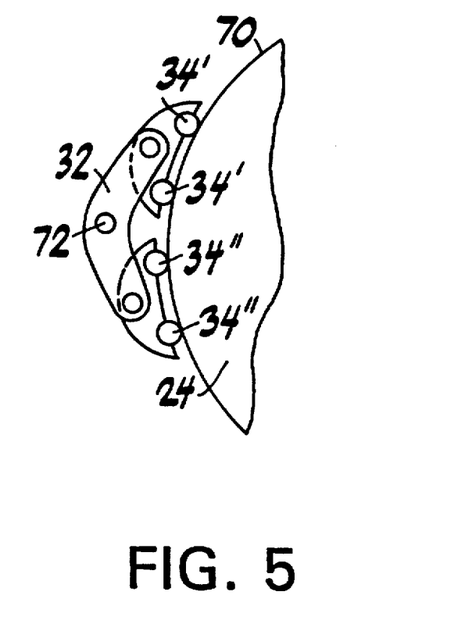
FIG. 5 a lateral view of a mounting support for tappet rollers with several tappet rollers.

In contrast to the tappet-roller mounting supports 32 depicted in FIG. 1 through 4, the mounting support 32 depicted in FIG. 5 shows four tappet rollers 34',34" which abut on the rolling surface 70 of the nose wheel 24. Two tappet rollers 34' or 34" at a time can swivel together opposite the mounting support 32, whereby the mounting support 32 itself can likewise be swivelled around a swivel axis 72. In this manner, the surface pressures between the tappet rollers 34',34" and the rolling surface 70 of the nose wheel 24 can be reduced. It is possible thereby to adapt to different nose-wheel diameters.

Figure 6:
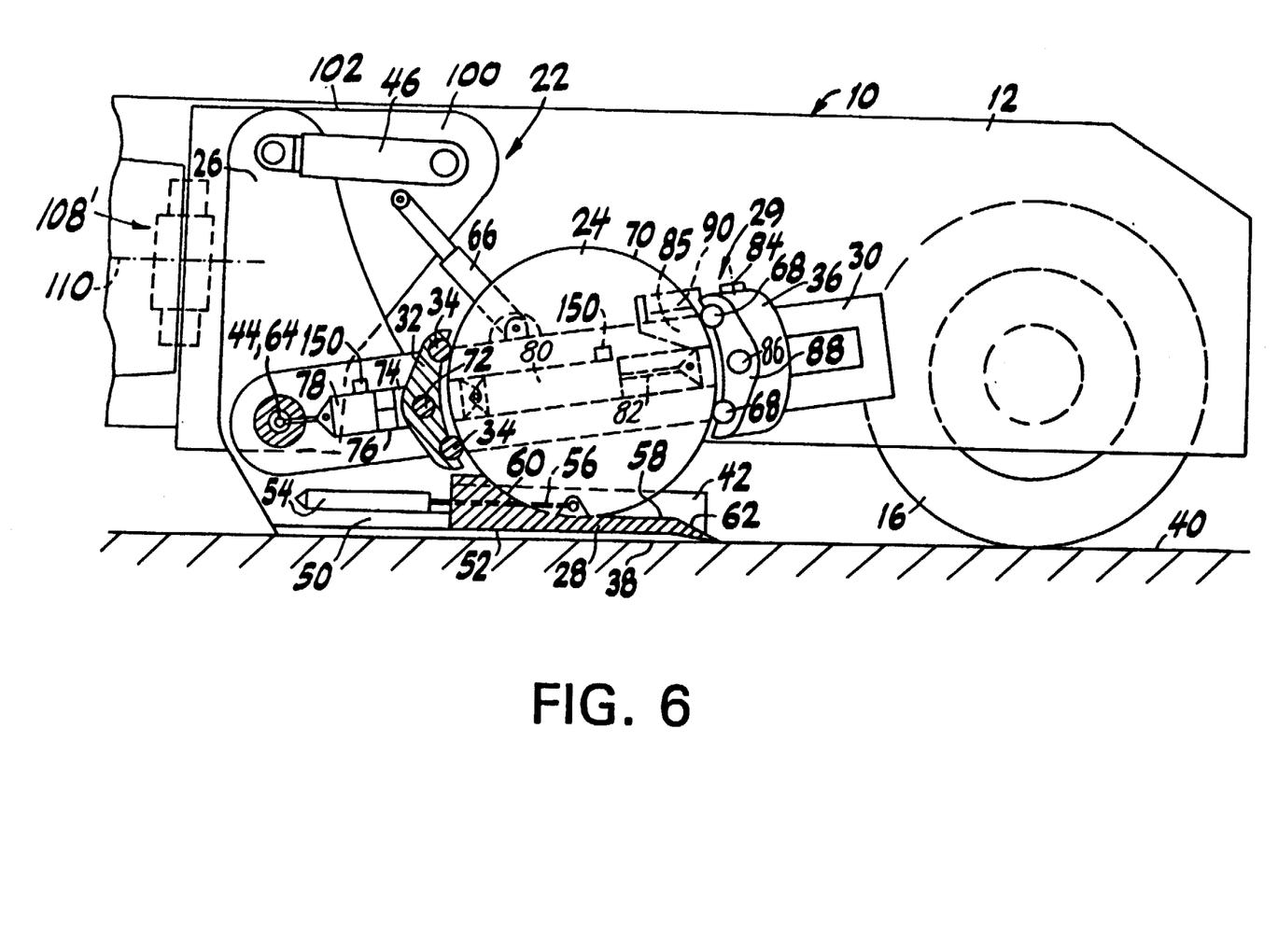
FIG. 6 a longitudinal section through the rear part of an aircraft tractor, in which the lifting fork can be raised and lowered independently of the gripping or clamping device.

The aircraft tractor 10 depicted in FIG. 6 features a lifting fork 26 which can swivel independently of the supporting bars 30,30' of the gripping or clamping device 29. The lifting fork 26 and the supporting bars 30,30' are rotatably supported there around a mutual swivel axis 44, 64 between the side walls 100 of a bearing block 102, which is connected via a swivel joint 108' to the chassis 12 of the aircraft tractor. The swivel joint 108' thereby fulfills the same task as the swivel joint 108 depicted in FIG. 3 which is arranged between the lifting fork and the chassis. The lifting fork 26, or rather the supporting bars 30,30', are raised and lowered by means of hydraulic cylinders 46 or 66, which are pivoted on the side walls 100 of the bearing block 102 and on the lifting fork 26 or on the supporting bars 30,30'. The retracted gripping arms 86 are not interlocked and project only far enough to the inside over the supporting bars 30, 30' to allow the nose-wheel support to be passed through between the gripping arms 36.

FIG. 7 depicts an aircraft tractor with a simplified pick-up attachment, which is preferably suited for attaching light airplanes and for application in a pushback operation. The tappet-roller mounting support 32 for the tappet rollers 34 abutting on the rolling surface 70 of the nose wheel 24 is movably supported with damping there with its swivel axis 72 in the side flanges 42 of the lifting fork 26. Two pressing-roller mounting supports 88, each able to be actuated by one hydraulic cylinder 104, are movably arranged in guideways 106 on the inner sides of the U-shaped chassis recess 20. The pressing-roller mounting supports which are rotatable around a swivel axis 86 each have two pressing rollers 68, which, after the actuation of the hydraulic cylinder 104, abut against the rolling surface 70 of the raised nose wheel 24. The piston-side compression chambers of the two hydraulic cylinders 104 are interconnected by a compensating line, so that when the rear part of the lifting fork 26 rotates around the axis of rotation 110, it is possible for the clamped nose wheel 24 to pendulate.

When an aircraft tractor is used to tow an airplane, the aircraft tractor is first brought closer to the stationary airplane, until its nose wheel 24 is situated inside the recess 20 of the aircraft tractor chassis 12.

To couple the aircraft tractor 10 depicted in FIG. 1 through 4, it is driven up to the nose wheel 24 until the tappet rollers 34 abut on its rolling surface 70. At this point, the lifting fork 26 with the retracted shovel 28 is lowered until the bearing surface 38 rests on the apron 40. The gripping arms 36, which are situated in their open position parallel to the supporting bars 30,30', are slid with the cocking cylinders 80 into the end positions of the guideways 76 of the supporting bars 30,30' and subsequently swivelled with the help of the swiveling cylinders 90 behind the nose wheel 24 which occupies the recess 20. The gripping arms 36, which are in alignment with each other in this position, are interlocked and are subsequently pulled through the action of the cocking cylinders 80 in the direction of the tappet rollers 34 until the pressing rollers 68 abut on the rolling surface 70 of the aircraft nose wheel 24. At this point, the aircraft tractor 10 and the aircraft nose wheel 24 are immovably coupled to each other and are standing stationary on the apron 40.

Another way to couple the aircraft tractor 10 to the nose wheel 24 does not consist in driving the aircraft tractor 10 up to the aircraft nose wheel 24 until it strikes against the nose wheel, but rather in stopping the aircraft tractor 10 just before it strikes against the nose wheel. After that, the gripping arms 36 are swivelled into the recess 20, while gripping the nose wheel 24 from behind, and are locked to each other in their end position. The interlocked gripping arms 36 are then pulled through the action of the cocking cylinders 80 in the direction of the tappet rollers 34 until the pressing rollers 68 abut on the nose wheel 24. Further action of the cocking cylinders 80 then causes the unbraked aircraft tractor 10 to be pulled back so far, until the tappet rollers 34 abut on the rolling surface 70 of the nose wheel 24. Consequently, the aircraft tractor 10 and the nose wheel 24 are immovably coupled to each other.

It is not necessary to couple the aircraft tractor and the nose wheel when both the aircraft tractor as well as the aircraft nose landing gear are kept immobile with respect to the apron while the nose wheel is attached. To immobilize the aircraft tractor, its parking brake is expediently activated, while the aircraft nose landing gear is kept at a standstill solely on the basis of the static friction between the other airplane wheels and the apron when the force acting parallel to the apron on the nose wheel when the shovel is slid underneath does not exceed the breakaway resistance of the stationary airplane. This is particularly guaranteed when, before being slid underneath, the shovel with its supporting surface can be lowered until it is close to the ground. The tendency for the airplane to roll away while the shovel is being slid underneath can be additionally counteracted by activating the brakes on the other airplane wheels.

When the aircraft tractor is stationary or coupled to the nose wheel, the shovel cylinders 54 are pressurized and the lowered shovel is slid in the guideway 50 under the unbraked nose wheel 24. In case of a coupling operation, the clamping force exerted by the cocking cylinder 80 by way of the tappet rollers 34 or the pressing rollers 68 on the aircraft nose wheel 24 is thereby adjusted so that the nose wheel 24 can turn when the shovel 28 is slid under it and so that it can roll on the top side 58 of the shovel, until it abuts on the stop face 60 of the shovel 28. The nose wheel 24 is then completely supported by the shovel 28.

The lifting cylinders 46 act upon the lifting fork 26 to raise it until the bearing surface 38 essentially shows the same ground clearance as the chassis 12 of the aircraft tractor 10. While the lifting fork 26 is raised, the jackwheels which prevent the aircraft tractor 10 from tipping in case of damage to the axles or wheels can be swung out.

To relieve the shovel cylinders 54 and the shovel 28, it is possible to lightly lift the nose wheel 24, which is coupled to the aircraft tractor and is clamped between the tappet rollers 34 and the pressing rollers 68, or rather is gripped from below by the tappet rollers 34 and the pressing rollers 68, off the apron 40 through the action of the hydraulic cylinders 66, or at least to reduce the ground pressure of the nose wheel 24 before the shovel 28 is slid under the nose wheel 24. After the shovel 28 is slid underneath, the raised nose wheel 24 is lowered on to the shovel 28 and subsequently, while resting on the shovel 28, lifted together with this shovel through the action of the lifting cylinders 46. To relieve the lifting cylinders 46 during the towing operation and to secure the lifting fork 26 to prevent it from dropping unintentionally, for example due to hydraulic damage, the lifting fork 26 is locked in its raised position with the help of the lock bolts 94 to the chassis 12 of the aircraft tractor 10.

A nose wheel which is not gripped from behind when the shovel is slid underneath it can be secured after the shovel is raised to prevent it from sliding on the shovel, for example, by means of the clamping device 29 depicted in FIG. 7. This type of clamping device is adequate, particularly when the aircraft tractor is used in a pure bush-back operation, in which it pushes the airplanes with a raised nose wheel back from the ramp to the taxiway. There, the nose wheel is pressed by the static thrust of the engines and by the rolling friction of the airplane against the tappet rollers and, already in this manner, is held in its carrying position on the raised shovel.

For the duration of the towing operation, the nose wheel 24 is retained by the gripping or clamping device 29 on the shovel 28 and immovably secured with respect to the aircraft tractor 10. As depicted in FIG. 1 through 4, 6 and 7, the tappet rollers 34 and the pressing rollers 68 can abut on opposite areas of the rolling surface 70 of the nose wheel 24. The nose wheel 24 is able to be even better secured on the shovel 28 when the tappet rollers 34 and the pressing roller 68 abut in the top half of the rolling surface 70, whereby the nose wheel 24 is pressed from above through the action of the hydraulic cylinder 66 against the shovel 28. For that, after the shovel 28 is slid underneath, the cocking cylinder 80 can be rendered pressureless for a short time, and during this period of time, the supporting bars 30,30' of the gripping or clamping device 29 can be lifted so far through the action of the hydraulic cylinders 66 that after renewed action of the cocking cylinder 80, the tappet rollers 34 and the pressing rollers 68 abut against the top half of the nose-wheel rolling surface 70.

In the case of the aircraft tractors depicted in FIG. 1 through 4, after the aircraft movement is terminated, the lifting fork 26 is lowered on to the apron, the clamping of the nose wheel 24 is released by unlocking and swivelling back the gripping arms 34, the shovel is moved away to the front under the nose wheel and after the lifting fork is raised the aircraft tractor is driven away from the nose wheel. In contrast to this, in the case of the aircraft tractor depicted in FIG. 6, after termination of the aircraft movement, the cocking cylinder 80 is relieved and subsequently the lifting fork 26, together with the nose wheel resting on the shovel 28, is lowered close to the apron, while the gripping or clamping device 29 remains raised in its carrying position. By driving the aircraft tractor away from the stationary airplane, the shovel 28 which has been lowered close to the ground can be pulled away from the nose wheel that is rolling off the shovel. As a stabilizing influence, the brakes can be thereby activated on the main chassis of the airplane.

If the aircraft tractor depicted in FIG. 7 is applied in the previously described manner, then the nose wheel can be lowered in a similar manner. In the push-back operation, the partially lowered shovel can be pulled out from under the nose wheel of the braked airplane by driving the aircraft tractor forwards.

I claim:

1. A method for coupling an aircraft landing gear having at least one nose wheel to a tractor, comprising the steps of:
   moving at least one of the tractor and the nose wheel relative to the other on an apron until they contact each other;
   coupling the tractor and the nose wheel to each other so that the tractor and aircraft landing gear are substantially stationary;
   moving a shovel member of the tractor relative to the tractor and underneath the nose wheel until the shovel member is located entirely between the nose wheel and the apron for receiving and at least partially supporting the nose wheel; and
   raising the shovel member to lift the nose wheel above the apron for towing the aircraft with the tractor.

2. A method as defined in claim 1, wherein the shovel member is moved underneath the nose wheel in a direction substantially perpendicular to the axis of rotation of the nose wheel and the nose wheel is rotated by engagement with the shovel member upon moving the shovel member underneath the nose wheel.

3. A method as defined in claim 1, wherein prior to coupling the tractor to the nose wheel, the nose wheel is gripped on one side by the tractor and the tractor is moved closer to the nose wheel until the tractor contacts the other side of the nose wheel.

4. A method as defined in claim 1, wherein the tractor and nose wheel are coupled to each other by abutting one side of the nose wheel against a limit stop of the tractor and engaging the other side of the nose wheel with the tractor and pressing the nose wheel against the limit stop.

5. A method as defined in claim 1, wherein the nose wheel is lifted above the apron prior to the step of moving the shovel member to facilitate moving the shovel member underneath the nose wheel.

6. A method as defined in claim 5, wherein after the shovel member is moved underneath the nose wheel, the raised nose wheel is lowered onto the shovel member.

7. A method as defined in claim 1, wherein after the shovel member is moved underneath the nose wheel, the nose wheel is immovably secured relative to the shovel member.

8. A method as defined in claim 7, wherein the nose wheel is immovably secured relative to the shovel ember by pressing the nose wheel against the shovel member.

9. A method as defined in claim 1, further including the step of locking the shovel member in a fixed position relative to the tractor upon raising the shovel member for towing the aircraft.

10. A method as defined in claim 1, wherein the tractor is uncoupled from the nose wheel by lowering the shovel member and moving the shovel member out from underneath the nose wheel while simultaneously permitting the nose wheel to roll off the shovel member.

11. A method for coupling an aircraft landing gear having at least one nose wheel to a tractor, comprising the steps of:
moving at least one of the tractor and the nose wheel relative to the other until they contact each other;
immovably retaining the tractor and the landing gear by coupling the tractor to the nose wheel;
shifting a shovel member of the tractor relative to the tractor and underneath the nose wheel until the shovel member is located underneath the entire nose wheel; and
raising the shovel member together with the nose wheel for towing the aircraft.

12. A method as defined in claim 11, wherein the landing gear is immovably retained by static friction between at least one other wheel of the aircraft and an apron.

13. A method as defined in claim 11, wherein the tractor and the landing gear are immovably retained by actuating a brake of at least one of the tractor and another wheel of the aircraft.

14. A method as defined in claim 11, further comprising the step of clamping the nose wheel between the shovel member and at least one limit stop of the tractor upon raising the shovel member to prevent the nose wheel from moving relative to the shovel member.

15. A tractor for towing an aircraft having a landing gear with at least one nose wheel, comprising:
a chassis including at least one recess for receiving the landing gear;
a shovel member coupled to the chassis and movable within the recess for being lowered to receive the nose wheel and raised to lift the nose wheel and tow the aircraft;
first means for immovably coupling the tractor to the landing gear wherein the first means includes a device coupled to the shovel member for rotatably supporting the nose wheel; and
second means for sliding the shovel member relative to the chassis and underneath the nose wheel to support the nose wheel on the shovel member and in turn raise the shovel member and the nose wheel to tow the aircraft.

16. A tractor as defined in claim 15, wherein the second means slides the shovel member in a direction oriented substantially perpendicular to the axis of rotation of the nose wheel.

17. A tractor as defined in claim 15, wherein the shovel member is raised to lift the nose wheel and the aircraft after the first means immovably couples the tractor to the landing gear.

18. A tractor as defined in claim 15, wherein the first means includes a device for gripping and clamping the nose wheel for securing the nose wheel to the shovel member by forcing the nose wheel against the shovel member.

19. A tractor as defined in claim 15, further including a lifting fork coupled between the shovel member and the chassis for raising and lowering the shovel member relative to the chassis.

20. A tractor as defined in claim 19, wherein the second means moves the shovel member longitudinally within the lifting fork.

21. A tractor as defined in claim 15, further including a locking member coupled to the chassis for engaging the shovel member in a raised position for locking the shovel member in the raised position to tow an aircraft.

22. A tractor as defined in claim 15, wherein the shovel member defines as gap between a bottom surface of the shovel member and an apron when lowered onto the apron.

23. A tractor as defined in claim 15, wherein the shovel member defines a chamfered edge for facilitating sliding the shovel member underneath the nose wheel.

24. A tractor as defined in claim 15, wherein at least a portion of the surface of the shovel member for contacting the nose wheel is coated with a wear-resistant plastic material.

25. A tractor as defined in claim 15, wherein the shovel member includes a surface for contacting the nose wheel shaped to substantially correspond to the curvature of the nose wheel.

26. A tractor as defined in claim 15, wherein the surface is substantially concave shaped.

27. A tractor as defined in claim 15, wherein the first means includes at least one tappet roller for engaging a portion of the rolling surface of the nose wheel in a limit-stop position and defining an axis of rotation oriented in a direction substantially perpendicular to the longitudinal axis of the tractor.

28. A tractor as defined in claim 27, wherein the first means further includes a mounting support coupled to the chassis and a plurality of tappet rollers rotatably supported in pairs on the mounting support, the mounting support being mounted to swivel about an axis substantially parallel to the axes of rotation of the tappet rollers.

29. A tractor as defined in claim 28, further including third means for permitting the tappet rollers to move within a limited range upon engaging the nose wheel in the direction of impact by the nose wheel.

30. A tractor as defined in claim 29, wherein the third means includes at least one shock absorbing member coupled between the tappet rollers and the mounting member, and at least one sensor coupled to the shock absorbing member for measuring a force exerted by the nose wheel on the tappet rollers.

31. A tractor as defined in claim 15, wherein the first means includes at least one gripping arm coupled to the chassis and mounted to swivel behind the nose wheel when located within the recess of the chassis, the gripping arm including at least one pressing roller rotatably mounted on the gripping arm for pressing against the rolling surface of the nose wheel.

32. A tractor as defined in claim 31, further including two gripping-arm supports, each coupled to the chassis on an opposite side of the recess relative to the other, and two gripping arms, each gripping arm being hinged to a respective gripping-arm support for swivelling relative to the gripping-arm support.

33. A tractor as defined in claim 32, further including means for locking the two gripping arms together upon being rotated behind and into engagement with a nose wheel.

34. A tractor as defined in claim 32, wherein the first means includes at least one tappet roller for engaging a portion of the rolling surface of the nose wheel in a limit-stop position and defining an axis of rotation oriented in a direction substantially perpendicular to the longitudinal axis of the tractor, and the gripping arms are movable toward the at least one tappet roller.

35. A tractor as defined in claim 32, further including two supporting bars, each being coupled between a respective gripping-arm support and the chassis and movable for raising and lowering the gripping arms relative to the chassis.

36. A tractor as defined in claim 35, wherein each supporting bar defines a guideway for receiving and supporting the respective gripping-arm support for permitting the respective gripping-arm support to move within the guideway.

37. A tractor as defined in claim 36, wherein the first means includes at least two tappet rollers for engaging a portion of the rolling surface of the nose wheel and each defining an axis of rotation oriented in a direction substantially perpendicular to the longitudinal axis of the tractor, each tappet roller being supported within a respective guideway for moving within the guideway.

38. A tractor as defined in claim 36, wherein each supporting bar is pivotally coupled to a lifting fork, which is in turn coupled to the chassis.

39. A tractor as defined in claim 37, wherein each gripping-arm support is coupled by means of a hydraulic cylinder to at least one tappet roller.

40. A tractor as defined in claim 39, further including at least one pressure sensor coupled to the hydraulic cylinder.

41. A tractor as defined in claim 15, further including a lifting fork coupled between the chassis and the shovel member, the lifting fork including a first portion pivotally coupled to the chassis and a second portion for supporting the shovel member and rotatable about an axis of rotation substantially parallel to the longitudinal axis of the tractor.

42. A tractor for towing an aircraft having a landing gear with at least one nose wheel, comprising:
a chassis including a recess for receiving the landing gear;
a shovel member coupled to the chassis and movable for being raised and lowered relative to the chassis, the shovel member defining a supporting surface movable relative to the chassis for sliding underneath the entire nose wheel when the tractor is in a stationary position for supporting the nose wheel and lifting the nose wheel off the ground by raising the shovel member relative to the chassis; and
a device coupled to the shovel member for rotatably supporting the nose wheel.

43. A tractor as defined in claim 42, further including at least one limit stop coupled to the shovel member for abutting against the nose wheel to immovably retain the nose wheel on the shovel member.

44. A tractor for towing an aircraft having a landing gear with at least one nose wheel, comprising:
a chassis including at least one recess for receiving the landing gear;
a shovel member coupled to the chassis and movable within the recess for being lowered to receive the nose wheel and raised to lift the nose wheel and tow the aircraft;
a lifting fork coupled between the shovel member and the chassis for raising and lowering the shovel member relative to the chassis;
first means for immovably coupling the tractor to the landing gear; and
second means for sliding the shovel member relative to the chassis and underneath the nose wheel to support the nose wheel on the shovel member and in turn raise the shovel member and the nose wheel to tow the aircraft.

45. A tractor as defined in claim 44, wherein the second means moves the shovel member longitudinally within the lifting fork.

46. A tractor for towing an aircraft having a landing gear with at least one nose wheel, comprising:
a chassis including at least one recess for receiving the landing gear;
a shovel member coupled to the chassis and movable within the recess for being lowered to receive the nose wheel and raised to lift the nose wheel and tow the aircraft;
a lifting fork coupled between the chassis and the shovel member, the lifting fork including a first portion pivotally coupled to the chassis and a second portion for supporting the shovel member and rotatable about an axis of rotation substantially parallel to the longitudinal axis of the tractor;
first means for immovably coupling the tractor to the landing gear; and
second means for sliding the shovel member relative to the chassis and underneath the nose wheel to support the nose wheel on the shovel member and in turn raise the shovel member and the nose wheel to tow the aircraft.

* * * * *

UNITED STATES PATENT AND TRADEMARK OFFICE
CERTIFICATE OF CORRECTION

PATENT NO. : 5,314,287
DATED : May 24, 1994
INVENTOR(S) : Wichert

It is certified that error appears in the above-indentified patent and that said Letters Patent is hereby corrected as shown below:

In column 10, line 61 change "ember" to -- member --;

Column 12, line 18 change "15" to -- 25 --;

Column 12, line 39 change "tappel" to -- tappet --.

Signed and Sealed this

Fourteenth Day of March, 1995

Attest:

BRUCE LEHMAN

Attesting Officer　　　Commissioner of Patents and Trademarks